United States Patent [19]
Rotstain

[11] Patent Number: 5,828,591
[45] Date of Patent: Oct. 27, 1998

[54] METHOD AND APPARATUS FOR USING A CACHE MEMORY TO STORE AND RETRIEVE INTERMEDIATE AND FINAL RESULTS

[75] Inventor: Jehoshua S. Rotstain, Haifa, Israel

[73] Assignee: Intel Corporation, Santa Clara, Calif.

[21] Appl. No.: 970,260

[22] Filed: Nov. 2, 1992

[51] Int. Cl.[6] .................................................. G06F 7/52
[52] U.S. Cl. ............................................................ 364/765
[58] Field of Search .................................. 364/736, 761, 364/762, 763, 764, 765, 766, 767, 752

[56] References Cited

U.S. PATENT DOCUMENTS

| | | | |
|---|---|---|---|
| 3,648,038 | 3/1972 | Sierra ....................................... | 364/765 |
| 4,688,186 | 8/1987 | Ferrell et al. ........................... | 364/764 |
| 4,797,849 | 1/1989 | Nakano ................................... | 364/765 |
| 4,989,173 | 1/1991 | Kaneda ................................... | 364/764 |
| 4,991,132 | 2/1991 | Kadota .................................... | 364/765 |
| 5,046,038 | 9/1991 | Briggs ..................................... | 364/765 |
| 5,107,452 | 4/1992 | Karmarkar et al. .................... | 364/754 |
| 5,144,576 | 9/1992 | Briggs ..................................... | 364/754 |
| 5,260,898 | 11/1993 | Richardson ............................. | 364/736 |

OTHER PUBLICATIONS

A.M. Odlyzko, "Lecture Notes in Computer Science 263" *Advances in Cryptology—Crypto '86* pp. 297–301, 1986.

I.B. Damgard, "Lecture Notes in Computer Science 473" *Advances in Cryptology—Eurocrypt '90* pp. 230–244, 1990.

*Primary Examiner*—Chuong Dinh Ngo
*Attorney, Agent, or Firm*—Blakely, Sokoloff, Taylor & Zafman

[57] ABSTRACT

A method and apparatus for performing division and remainder operations is described which first comprises two data inputs, each for inputting one of a dividend and a divisor. Cache memory look-up table circuitry is used for determining whether a first value is present in a cache memory, the first value representing the value of the divisor. Cache memory retrieval circuitry is used for reading a second value from the cache memory as a reciprocal of the divisor, the second value corresponding to the first value and representing the reciprocal of the first value, in the event that the first value is determined to be present in the cache memory. A multiplier is then used to multiply the reciprocal and the dividend to get the result. Alternatively, in remainder operations, the second value may be a previously determined quotient stored in the cache memory.

26 Claims, 3 Drawing Sheets

METHOD AND APPARATUS FOR USING A CACHE MEMORY TO STORE AND RETRIEVE INTERMEDIATE AND FINAL RESULTS

FIELD OF THE INVENTION

The present invention relates to processes and mechanisms for transferring data between an arithmetic circuit and a cache memory.

BACKGROUND OF THE INVENTION

With the high-powered computers of today, simple arithmetic operations such as addition, subtraction, and multiplication can be performed quickly and efficiently. The speed and efficiency of division operations, however, have not been altogether satisfactory. Accordingly, presently available division techniques continue to be relatively slow and burdensome, thus consuming valuable computer resources.

Moreover, integer division operations and integer reciprocal operations are frequently performed independently of one another in situations, for example, where several processors work together in a parallel fashion to solve complex matrix problems. In such an environment, a division operation may be performed on a dividend and a divisor to obtain the integer quotient, and at a later time, the same division operation may be performed to obtain the remainder.

In both floating point and integer division environments, there has thus been a long-felt need to perform division operations accurately and efficiently. Presently, division algorithms can be grouped into two classes according to the iterative operator. The first class involves the use of subtraction as an iterative operator. This class contains well-known algorithms such as non-restoring division, and is relatively slow because the execution time of algorithms in this class is proportional to the divisor operand length. Division of 64 bit operands, for example, may take 24 clock cycles on a Radix 8 divider.

The second class involves the use of multiplication as the iterative operator, and is generally a higher speed class of algorithms. Algorithms of this class converge quadratically, and the execution time is proportional to log 2 of the divisor length. Many multiplication algorithms in this class compute a reciprocal of the divisor in finding the quotient. The idea of this reciprocal procedure is to compute the product of "A" and "1/B" instead of directly dividing "A" by "B." That is, instead of computing "A/B" the reciprocal of "B" is first found and then the reciprocal is multiplied by "A."

The procedure for finding the reciprocal typically uses a read only memory (ROM) for a first guess and then uses add and multiply iterations. As compared to the first class of division algorithms, division of 64 bit operands typically takes between 6 and 20 clock cycles, depending on the ROM size and the strength of the multiplier used. Although the execution time of algorithms in this class can be increased by using a large ROM and/or a strong multiplier, such elements can be undesirable to the extent that they consume large, expensive silicon areas.

From the above discussion, it is clear that division operations are not easily performed, and accordingly, users are often forced to avoid division operations where possible.

SUMMARY OF THE INVENTION

The present invention does not introduce a third class of division algorithms which renders the first two classes obsolete. Rather, the present invention recognizes the limitations of time and money which accompany operations that rely heavily on division functions, and seeks to conserve and use efficiently the computer resources dedicated to such operations.

Accordingly, the present invention incorporates existing multiplication algorithms into a novel system for conserving processor time in the execution of high-density mathematical operations. In seeking to conserve processor time, the present invention utilizes the premise that, according to many application codes, division operations frequently use the same divisors many times with only different dividends.

In implementing this premise, the present invention uses a cache memory to store and retrieve intermediate and final results, thus avoiding unnecessary, repetitious division operations.

Accordingly, it is an objective of the present invention to provide an improved method of implementing high-density division operations.

Another objective of the present invention is to provide an improved apparatus for implementing high-density division operations.

These and other objects of the present invention are provided for by a method of performing division operations wherein the method includes the steps of inputting a first dividend and a first divisor, determining a reciprocal of the first divisor, storing the first divisor and the reciprocal into a cache memory, multiplying the reciprocal and the first dividend, inputting a second dividend and a second divisor, determining whether a value corresponding to the second divisor is present in the cache memory, reading as a second reciprocal the reciprocal from the cache memory in the event that a value corresponding to the second divisor is determined to be present in the cache memory, determining a second reciprocal of the second divisor in the event that a value corresponding to the second divisor is determined to not be present in the cache memory, and multiplying the second reciprocal and the second dividend.

These and other objects of the present invention are also provided for by a circuit for performing division operations wherein the circuit includes two latches, each for inputting one of a first dividend and a first divisor, a divider for determining a reciprocal of the first divisor, a cache memory for storing the first divisor and the reciprocal, a multiplier for multiplying the reciprocal and the first dividend, latch circuitry associated with the two latches for inputting a second dividend and a second divisor, cache memory look-up table circuitry for determining whether a value corresponding to the second divisor is present in the cache memory, cache memory retrieval circuitry for reading as a second reciprocal the reciprocal from the cache memory in the event that a value corresponding to the second divisor is determined to be present in the cache memory, divider circuitry associated with the divider for determining a reciprocal of the second divisor in the event that a value corresponding to the second divisor is determined to not be present in the cache memory, and multiplier circuitry associated with the multiplier for multiplying the reciprocal of the second divisor and the second dividend in the event that a value corresponding to the second divisor is determined to not be present in the cache memory.

It is also an object of the present invention to provide a method of performing remainder operations wherein the method includes the steps of inputting a dividend and a divisor, determining whether a first value is present in a cache memory, the first value representing the value of the divisor, upon a determination that the first value is present determining whether a second value is present in the cache memory, the second value representing the value of the dividend, and upon a determination that the second value is present performing the following steps: reading the first and second values from the cache memory, reading a third value from the cache memory as a quotient of the dividend and the divisor, the third value corresponding to the first and second values and representing the quotient of the first and second values, and finding the remainder of the dividend and the divisor using the dividend, the divisor, and the third value read from the cache memory.

It is a further object of the present invention to provide a circuit for performing remainder operations wherein the circuit comprises two latches, each for inputting one of a dividend and a divisor, cache memory look-up table circuitry for determining whether a first value is present in a cache memory, the first value representing the value of the divisor, cache memory look-up table circuitry for determining, upon a determination that the first value is present, whether a second value is present in the cache memory, the second value representing the value of the dividend, cache memory retrieval circuitry for, upon a determination that the second value is present, both reading the first and second values from the cache memory, and reading a third value from the cache memory as a quotient of the dividend and the divisor, and a multiplier for finding the remainder of the dividend and the divisor using the three values read from the cache memory, upon a determination that the second value is present.

Other objects, features, and advantages of the present invention will be apparent from the accompanying drawings and from the detailed description which follows.

DETAILED DESCRIPTION OF THE INVENTION

A method and apparatus for using a cache memory to store and retrieve intermediate and final results will now be described. In the following description, numerous specific details are set forth such as bit lengths, bus widths, etc., in order to provide a thorough understanding of the present invention. It will be evident, however, to those skilled in the art that these specific details need not be used to practice the present invention. In other instances, well-known structures and circuits have not been shown in detail in order to avoid unnecessarily obscuring the present invention.

Figure 1:
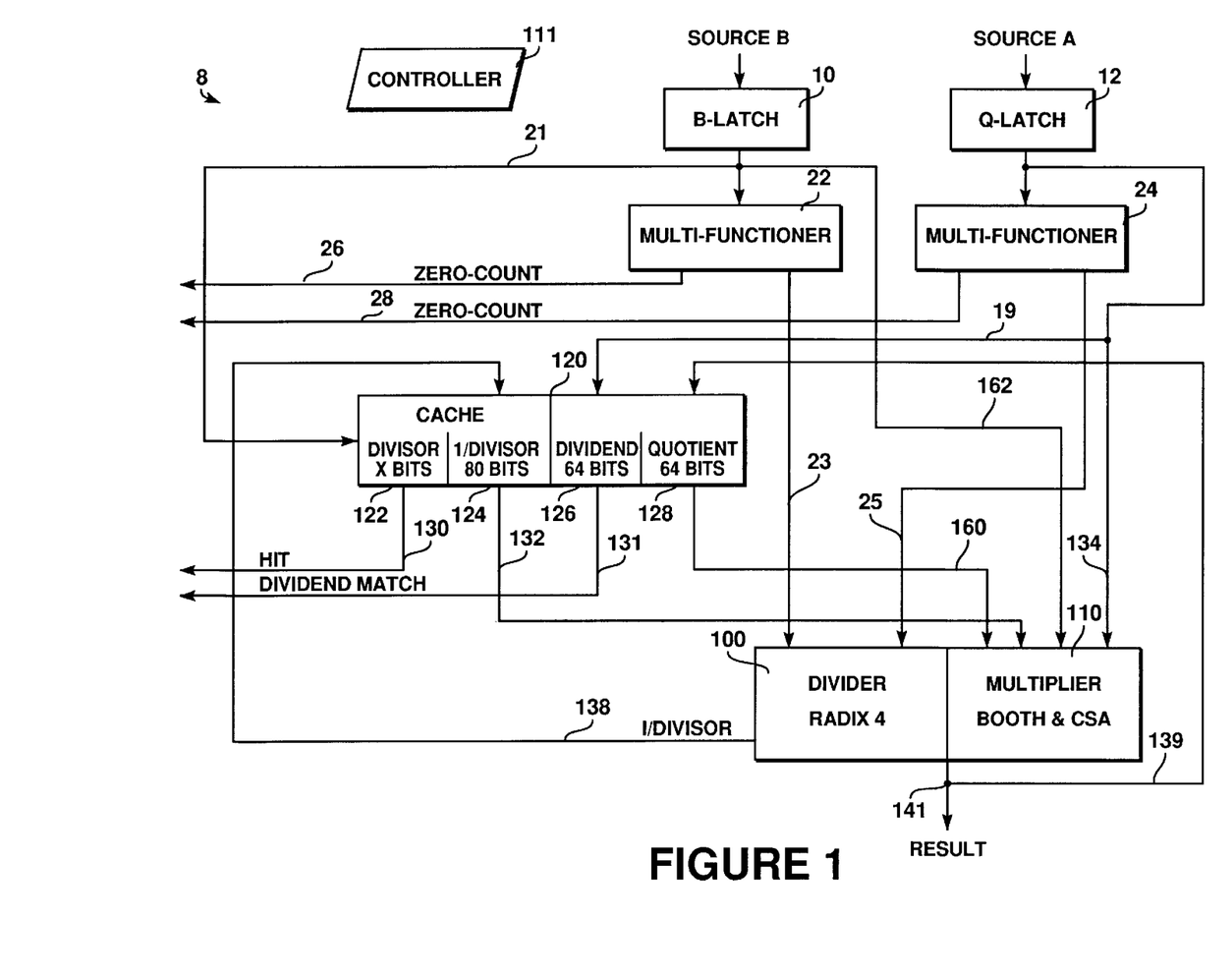
FIG. 1 is a block diagram of the overall system architecture which shows how the cache memory of the presently preferred embodiment is connected to other elements of the system.

Turning to FIG. 1, an execution unit 8 in a microprocessor is depicted. The two latches depicted at 10 and 12 are known in the art and are common in execution units such as the presently described unit. Each of the two latches receives and holds an operand.

The operand from b-latch 10 is fed to multi-functioner 22, which comprises a normalizer, a shift register, and a zero-counter. As is known in the art, the normalizer and shift register prepare the operand for division operations by divider 100. Multi-functioner 22 also comprises a zeros-counter, which, as is known in the art, counts any leading zeros in the operand, thus preparing the operand for multiplication by multiplier 110.

Similarly to multi-functioner 22, multi-functioner 24 accepts the operand from a-latch 12. Multi-functioner 24 comprises a shift register and a zeros-counter, which prepare the operand for divider 100 and multiplier 110, respectively. In the case of regular multiplication operations wherein the present invention operates as a standard multiplier, the zero-counters of multi-functioners 22 and 24 send zero-counts to a controller 111 via lines 26 and 28, respectively. Accordingly, multi-functioners 22 and 24 are configured to prepare operands for either division operations by divider 100 or for multiplication operations by multiplier 110.

As is well known in the art, a typical cache memory includes control circuitry along with rows of data. The control circuitry usually includes look-up circuitry to determine if a desired piece of data is present as well as retrieval circuitry to retrieve the desired data. Cache memory look-up and retrieval circuitry methods are well-known in the art and are not detailed in this disclosure. FIG. 1 shows a cache memory 120 which includes control circuitry 121. Control circuitry 121 includes look-up circuitry 121a, retrieval circuitry 121b, other control circuitry 121c, and control and data lines 121d coupling the control circuitry to sets of data rows.

Each row of the cache memory 120 of the presently preferred embodiment comprises storage for a divisor field 122 which is an address field, a reciprocal field 124, a dividend field 126, and a quotient field 128. In the case of division, the operand from b-latch 10 is the divisor. The divisor is fed to the cache memory 120 via line 21, where the cache memory 120 compares the divisor with the rows of the divisor field 122. If a value representing the value of the divisor is found in the divisor field 122, a "hit" message is sent to the controller 111 via line 130.

Upon a "hit," the value of the reciprocal of the divisor is then retrieved from a row in the reciprocal field 124 which is the same row of the cache memory 120 that the divisor was found. The reciprocal is then fed to multiplier 110 via line 132. The multiplier 110 receives the reciprocal of the divisor via line 132, receives the dividend via line 134, and multiplies the two, in effect yielding the quotient of the dividend and the divisor. Accordingly, in the case of division and in the event of a "hit," the reciprocal of the divisor is read from the cache memory 120 instead of being calculated, thus saving valuable computer resources in the division operation.

In the event that a value representing the value of the divisor is not found in the divisor field 122 of the cache memory 120, division is performed by divider 100 as follows. Divider 100 receives as input the shifted and normalized operand (the divisor) from multi-functioner 22 via line 23, and receives as input the shifted operand (the dividend) from multi-functioner 24 via line 25. In dividing the dividend by the divisor, as is known in the art, the divider 100 computes the reciprocal of the divisor. The divider 100 places the reciprocal of the divisor on line 138 for placement into the reciprocal field 124 of the cache memory 120. The divisor is also placed in the divisor field 122 on the same row of the cache memory 120 as the reciprocal.

In the case of a simple multiply operation, the two operands from b-latch 10 and a-latch 12 may simply be input into multiplier 110 and multiplied. The multiplier 110 and divider 100 share a series of registers, carry-save adders, and adders, thus minimizing the amount of hardware used by the two. Details of the multiplier 110 are disclosed in U.S. patent application Ser. No. 07/970,297, filed Nov. 2, 1992 of David Eisig and Jehoshua S. Rotstain entitled "Method and Apparatus for Re-Configuring a Partial Product Reduction Tree." The above-referenced patent application has been assigned to the assignee of the present invention, and the contents of the application are hereby referred to and incorporated by reference.

In the case of integer arithmetic (as opposed to floating point which the above description has been directed), division operations may be performed and remainder operations (i.e., finding the remainder from an integer division operation) may subsequently be performed independent of any of the corresponding division operations. Remainder operations are especially prominent in situations where several processors work together in a parallel fashion, an environment envisioned by the applicant of the present invention. In performing matrix operations in a parallel computing environment, for example, integer-quotient operations and remainder operations are performed frequently and independently of each other.

Regarding integer arithmetic, the present invention utilizes the relationship that for a given dividend and divisor, the quotient may be expressed in the form of an integer and a remainder. In such a case, the remainder can be determined from subtracting from the dividend the product of the integer quotient and the divisor.

Accordingly, the present invention, when operating in integer arithmetic, places each integer quotient result on line 139 in addition to placing each reciprocal on line 138. As before, the divisor and the reciprocal are stored in a row of the cache memory 120. Additionally, the integer quotient on line 139 is stored in the quotient field 128 of the cache memory 120 on the same row as the divisor and the reciprocal. Moreover, the operand from the a-latch 12 is placed into the dividend field 126 on the same row of the cache memory 120 via line 19.

A resulting 4-element row of the cache memory 120 is thereby formed with each unique integer division operation. As will be described below with reference to FIG. 3, a remainder operation can be performed by first comparing the divisor from b-latch 10 with the rows of the divisor field 122 of cache memory 120. In the event of a "hit," the "hit" message is sent to the controller 111 via line 130. Secondly, the dividend field 126 on the same row that the divisor "hit" occurred is compared with the dividend from the a-latch 12. In the event of a match, a "dividend match" message is sent to the controller 111 via line 131.

The value of the quotient field 128 is then fed to multiplier 110 via line 160, and the divisor and dividend are fed from b-latch 10 and a-latch 12 to multiplier 110 via lines 162 and 134, respectively. Alternatively, the values of the divisor field 122 and the dividend field 126 may be fed from the cache memory 120 to the multiplier 110 via two additional lines, according to preference. With the four inputs, the multiplier 110 can compute the remainder without having to divide or compute a reciprocal.

Figure 2:
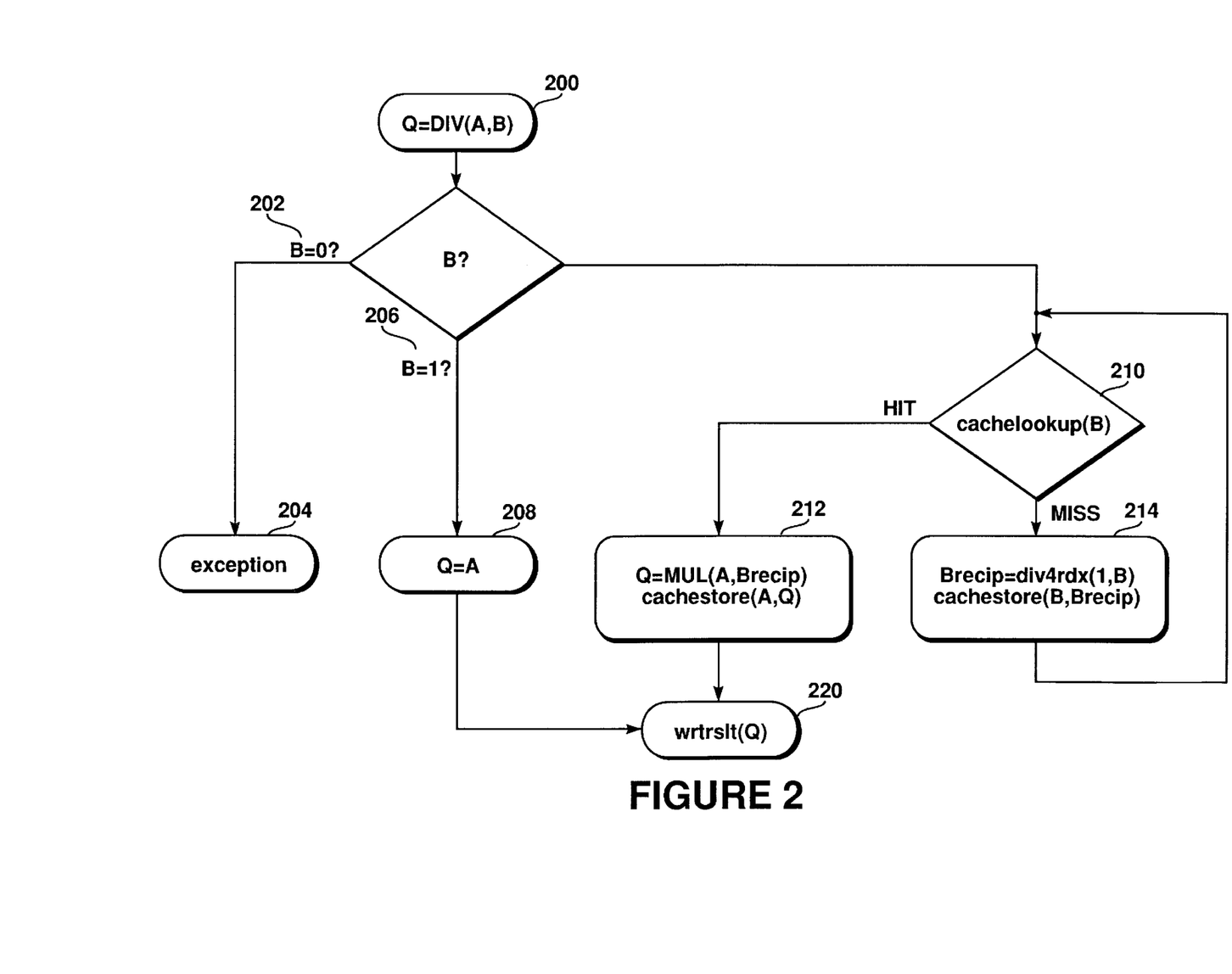
FIG. 2 is a flowchart of the division operation of the presently preferred embodiment of the present invention.

The method of the division operation of the presently preferred embodiment of the invention will now be described with reference to FIG. 2. FIG. 2 shows at step 200 a dividend "A" and a divisor "B." In the presently preferred embodiment, the dividend "A" and the divisor "B" are each 64 bit values. The present invention, however, works equally well with other length operands and is therefore not limited to the specifically disclosed embodiment. As shown at step 202, the controller 111 first determines whether the divisor is equal to zero. The controller 111 makes this check by reading the zero-count value on line 26. The controller 111 thus determines whether the zero-count value is equal to 64, in which case the divisor is determined to have a value of zero (the 64 bit operand is all zeros). Upon a determination that the divisor is equal to zero, an "exception" occurs as shown at step 204 and the quotient is not found, thus avoiding division by zero. The controller 111 also determines whether the zero-count is equal to 63. If the value of the zero-count on line 26 is determined to be 63, the divisor is determined to be one, as shown at step 206, and the quotient is assigned the value of the dividend, as shown at step 208.

In the event that the divisor is neither zero nor one, then controller 111 directs the cache memory 120 to look for the value of the divisor in the rows of the divisor field 122 of the cache memory 120. This step is shown at 210. As shown in FIG. 1, the cache memory 120 receives the divisor via line 21. In the event the divisor is found in the divisor field 122 of the cache memory 120, a "hit" message is sent to the controller via line 130, as described previously.

Step 212 shows the action of the controller 111 in the event that a "hit" occurs. At step 212, the cache memory 120 supplies the value of the corresponding reciprocal field 124 (i.e., the reciprocal field 124 on the same row as the divisor field 122 containing the value of the divisor) to the multiplier 110 via line 132. The multiplier 110 then accepts the reciprocal value from line 132, and multiplies the value with the dividend, which is supplied to the multiplier 110 from line 134. The product of the reciprocal value and the dividend thus yields the quotient. The dividend and the quotient are stored in the corresponding dividend field 126 and quotient field 128, respectively. The final result (or quotient) is placed on line 141, as shown at step 220.

Accordingly, it is noted that in the preferred embodiment any previous values in the dividend and quotient fields are overwritten, thus yielding one current row in the cache memory 120 for each divisor and reciprocal. It is noted, however, that the invention may be effectively implemented by not overwriting previous dividend and quotient fields. In such an embodiment, multiple rows having the same divisor and reciprocal fields but different dividend and quotient fields could exist. Such an embodiment would, of course, need a means of differentiating any identical divisor fields (which are used as address fields).

In another alternative embodiment, the cache memory 120 may be configured to compare the corresponding dividend field 126 with the dividend on line 19. In the event a match is found, the "dividend match" message is placed on line 131. The controller 111, upon receipt of the "dividend match," directs the cache memory 120 to place the value of the corresponding quotient field 128 on line 160. The multiplier 110 is then instructed by the controller 111 to accept the value on line 160 as the result, and accordingly, the value is placed on line 141 as the final result. It is noted that, although this alternative embodiment for division operations may save processing time when both the divisor and the dividend are found in the cache memory 120, the embodiment by its nature requires each unique divisor, reciprocal, dividend, and quotient combination to be stored in the cache memory 120. The presently preferred embodiment, however, requires only each new divisor, reciprocal combination to be stored in the cache memory 120.

Step 214 shows the action of the controller 111 in the event of a "miss" (the divisor is not found in the cache memory 120). In this event, because the divisor is not found in the cache memory 120, the controller 111 directs the divider 100 to accept the normalized and shifted value of the divisor from line 23 and to find the reciprocal of the divisor. The divider 100 places the reciprocal on line 138, where it is then received by and stored into the cache memory 120 along with a corresponding value in the divisor field 122 on the same row as the value of the divisor. That is, a new row of the cache memory 120 is formed with fields 122 and 124 taking on the values of the divisor and the reciprocal of the divisor, respectively.

After the new row of the cache memory 120 is formed, the operation loops up to step 210 where the cache memory 120 addresses and retrieves the newly determined value of the corresponding reciprocal field 124. (Of course, the invention could be configured to branch straight to step 212 instead of looping to step 210.) The value is supplied to the multiplier 110 via line 132. The multiplier 110 accepts the reciprocal value from line 132 and multiplies the value with the dividend supplied to the multiplier 110 via line 134, as shown at step 212. The product of the reciprocal value and the dividend forms the quotient. The dividend and the quotient are stored in the corresponding dividend field 126 and quotient field 128, respectively. The final result (the quotient) is placed on line 141, as shown at step 220.

The method of the remainder operation of the presently preferred embodiment of the invention will now be described with reference to FIG. 3. As described above, in the case of integer arithmetic, the present invention may be configured to perform division operations and remainder operations in integer form. By using the relationship that the remainder is equal to the dividend less the product of the quotient and the divisor, the presently preferred embodiment minimizes division operations by storing and retrieving quotients in the quotient field 128 of the cache memory 120.

Figure 3:
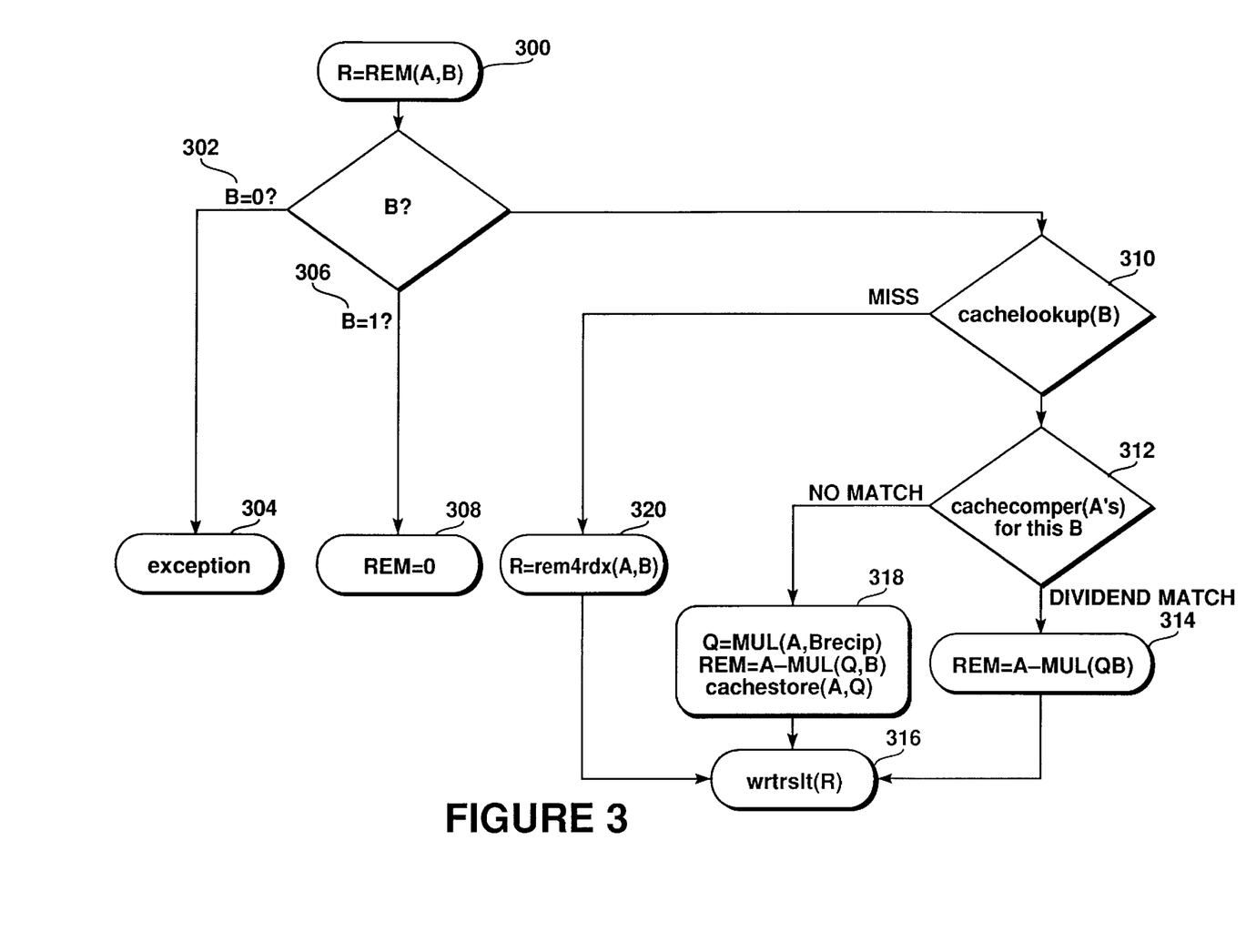
FIG. 3 is a flowchart of the remainder operation of the presently preferred embodiment of the present invention.

FIG. 3 shows at step 300 a remainder operation applied to a dividend "A" and a divisor "B." As shown at step 302, the controller 111 first determines whether the divisor is equal to zero. The controller 111 makes this check by reading the zero-count value on line 26. As mentioned above, the dividend and divisor are each 64 bit values, and the controller 111 determines whether the zero-count value of the divisor is equal to 64. If the zero-count value is equal to 64, the divisor is determined to have a value of zero, and an "exception" occurs as shown at step 304. The controller 111 also determines whether the zero-count is equal to 63. If the value of the zero-count on line 26 is determined to be 63, the divisor is determined to be one, as shown at step 306, and the remainder is assigned the value of zero, as shown at step 308.

In the event the divisor is neither zero nor one, the controller 111 directs the cache memory 120 to look up the value of the divisor, as shown at step 310. The cache memory 120 receives the divisor via line 21, and places a "hit" message on line 130 in the event the divisor is found in any row of the divisor field 122. Upon finding the divisor in the divisor field 122, the cache memory 120 compares the corresponding dividend field 126 on the same row with the dividend on line 19. In the event a match is found, the "dividend match" message is placed on line 131.

The controller receives the "dividend match" message and directs the cache memory 120 to place the value of the corresponding quotient field 128 on line 160. The multiplier 110 is then instructed by the controller 111 to multiply the quotient on line 160 and the divisor on line 162, and to subtract from the dividend on line 134 that product. Following the computation, which is shown at step 314, the final result (the remainder) is placed on line 141, as shown at step 316.

Step 318 shows the action of the controller 111 in the event the divisor is found in the divisor field 122 (hence a "hit"), but the dividend is not found in the corresponding dividend field 126. Because the dividend is not present in the corresponding row of the cache memory 120, the quotient must first be computed. The quotient is computed by utilizing the value of the reciprocal. Because the divisor was found in the divisor field 122, it is understood that the reciprocal of the divisor will reside in the reciprocal field 124 on the same row. Accordingly, the cache memory 120 supplies the value of the corresponding reciprocal field 124 to the multiplier 110 via line 132. The multiplier 110 accepts the reciprocal value, and multiplies that value with the dividend supplied on line 134, thus yielding the quotient. The dividend and the quotient are stored in the corresponding dividend field 126 and quotient field 128, respectively. Once the quotient is found using the reciprocal from the cache memory 120, the equation of step 314 can be implemented as described previously, and the remainder can be placed on line 141, as shown at step 316.

Finally, looking back to step 310, if the divisor is not found in any of the rows of the divisor field 122, a "miss" occurs, and the remainder is found using a conventional method such as Radix 4 division. This computation is shown at step 320. The remainder is then written to line 141 at step 316 as the final result.

Whereas many alterations and modifications of the present invention will no doubt become apparent to a person of ordinary skill in the art after having read the foregoing description, it is to be understood that the particular embodiments shown and described by way of illustration are in no way intended to be considered limiting. For example, although this disclosure shows an implementation which uses a cache memory to find a reciprocal when the divisor is less than or equal to twelve bits, other implementations are also possible. Moreover, a special cache memory may be used for division and remainder operations, or a general cache may be used. In the case of a general cache, divisors may be differentiated from other elements in the address field of the cache by use of an extra bit. Therefore, reference to the details of the presently preferred embodiment are not intended to limit the scope of the claims which themselves recite only those features regarded as essential to the invention.

I claim:

1. A method of performing division operations, including the following steps:

inputting a dividend and a divisor;

determining whether a first value is present in a cache memory, the first value representing the value of the divisor;

reading a second value from the cache memory as a reciprocal of the divisor, the second value corresponding to the first value and representing the reciprocal of the first value, and finding the quotient by multiplying the second value and the dividend, in the event that the first value is determined to be present in the cache memory; and finding the quotient of the dividend and the divisor by determining a reciprocal of the divisor and multiplying the reciprocal and the dividend, in the event that the first value is determined to not be present in the cache memory.

2. A method of performing division operations, including the following steps:
inputting a first dividend and a first divisor;
determining a reciprocal of the first divisor;
storing the first divisor and the reciprocal into a cache memory;
multiplying the reciprocal and the first dividend;
inputting a second dividend and a second divisor;
determining whether a value corresponding to the second divisor is present in the cache memory;
reading as a second reciprocal the reciprocal from the cache memory, in the event that a value corresponding to the second divisor is determined to be present in the cache memory;
determining a second reciprocal of the second divisor, in the event that a value corresponding to the second divisor is determined to not be present in the cache memory; and
multiplying the second reciprocal and the second dividend.

3. A method of performing division operations, including the following steps:
inputting a dividend and a divisor;
determining whether a first value is present in a cache memory, the first value corresponding to the value of the divisor;
reading a second value from the cache memory as a reciprocal of the divisor, the second value corresponding to the first value and representing the reciprocal of the first value, in the event that the first value is determined to be present in the cache memory;
determining a reciprocal of the divisor, in the event that the first value is determined to not be present in the cache memory; and
multiplying the reciprocal and the dividend.

4. A method of performing remainder operations, including the following steps:
inputting a dividend and a divisor;
determining whether a first value is present in a cache memory, the first value representing the value of the divisor;
upon a determination that the first value is present, determining whether a second value is present in the cache memory, the second value representing the value of the dividend; and
upon a determination that the second value is present, performing the following steps:
reading a third value from the cache memory as a quotient of the dividend and the divisor, the third value corresponding to the first and second values and representing the quotient of the first and second values; and
finding the remainder of the quotient of the dividend and the divisor using the third value read from the cache memory.

5. The method of performing remainder operations according to claim 4, further including the step of finding the remainder of the quotient of the dividend and the divisor, in the event that the first value is determined to not be present in the cache memory.

6. The method of performing remainder operations according to claim 5, wherein the step of finding the remainder includes the step of finding the remainder using Radix 4 division.

7. The method of performing remainder operations according to claim 4, further including the following steps, in the event that the second value is determined to not be present in the cache memory:
reading a fourth value from the cache memory as a reciprocal of the divisor, the fourth value corresponding to the first value and representing the reciprocal of the first value; and
finding the remainder of the quotient of the dividend and the divisor using the dividend, the divisor, and the fourth value.

8. A method of performing remainder operations, including the following steps:
inputting a dividend and a divisor;
determining whether a first value is present in a cache memory, the first value representing the value of the divisor;
upon a determination that the first value is not present in the cache memory, finding the remainder of the quotient of the dividend and the divisor;
upon a determination that the first value is present, determining whether a second value is present in the cache memory, the second value representing the value of the dividend;
upon a determination that the second value is present, performing the following steps:
reading a third value from the cache memory as a quotient of the dividend and the divisor, the third value corresponding to the first and second values and representing the quotient of the first and second values; and
finding the remainder of the quotient of the dividend and the divisor using the dividend, the divisor, and the third value read from the cache memory;
upon a determination that the second value is not present, performing the following steps:
reading a fourth value from the cache memory as a reciprocal of the divisor, the fourth value corresponding to the first value and representing the reciprocal of the first value; and
finding the remainder of the quotient of the dividend and the divisor using the dividend, the divisor, and the fourth value.

9. The method of performing remainder operations according to claim 8, wherein the step of finding the remainder of the dividend and the divisor upon a determination that the first value is not present in the cache memory includes the step of finding the remainder using Radix 4 division.

10. A method of performing remainder operations, including the following steps:
inputting a first dividend and a first divisor;
determining a reciprocal of the first divisor;
storing the first divisor, the reciprocal, and the first dividend into a cache memory;
multiplying the reciprocal and the first dividend to find a quotient of the first dividend and the first divisor;
storing the quotient in the cache memory;
inputting a second dividend and a second divisor;
determining whether the second divisor is present in the cache memory;
upon a determination that the second divisor is present, determining whether the second dividend is present in the cache memory; and upon a determination that the second dividend is present, performing the following steps:
   reading the second dividend, the second devisor, and the quotient from the cache memory; and
   finding the remainder of the quotient of the second dividend and the second divisor using the three values read from the cache memory.

11. The method of performing remainder operations according to claim 10, further including the step of finding the remainder of the quotient of the second dividend and the second divisor, in the event that the second divisor is determined to not be present in the cache memory.

12. The method of performing remainder operations according to claim 11, wherein the step of finding the remainder includes the step of finding the remainder using Radix 4 division.

13. The method of performing remainder operations according to claim 10, further including the following steps, in the event that the second dividend is determined to not be present in the cache memory:
   reading the reciprocal from the cache memory as a reciprocal of the second divisor; and
   finding the remainder of the quotient of the second dividend and the second divisor using the second dividend, the second divisor, and the reciprocal.

14. A circuit for performing remainder operations, comprising:
   two latches, each for inputting one of a dividend and a divisor;
   a cache memory for storing and retrieving values, said cache memory being coupled to said latches for receiving the dividend and the divisor, said cache memory further comprising:
      cache memory look-up table circuitry for determining whether a first value is present in the cache memory, the first value representing the value of the divisor, and for determining, upon a determination that the first value is present, whether a second value is present in the cache memory, the second value representing the value of the dividend;
      cache memory retrieval circuitry for, upon a determination that the second value is present, both reading the first and second values from the cache memory, and reading a third value from the cache memory as a quotient of the dividend and the divisor; and
   a multiplier for finding the remainder of the quotient of the dividend and the divisor using the first, second, and third values read from the cache memory upon a determination that the second value is present in the cache memory, said multiplier being coupled to the cache memory in a way such that said multiplier is capable of receiving the first, second, and third values upon a determination that the second value is present in the cache memory.

15. The circuit for performing remainder operations according to claim 14, further comprising a divider for finding the remainder of the quotient of the dividend and the divisor, in the event that the first value is determined to not be present in the cache memory, said divider being coupled to said latches in a way such that said divider is capable of receiving the dividend and the divisor in the event that the first value is determined to not be present in the cache memory.

16. The circuit for performing remainder operations according to claim 15, wherein the divider includes circuitry for finding the remainder using Radix 4 division.

17. The circuit for performing remainder operations according to claim 14, further comprising:
   cache memory retrieval circuitry for, in the event that the second value is determined to not be present in the cache memory, reading a fourth value from the cache memory as a reciprocal of the divisor, the fourth value corresponding to the first value and representing the reciprocal of the first value; and
   multiplier circuitry associated with the multiplier for finding the remainder of the quotient of the dividend and the divisor using the dividend, the divisor, and the fourth value, said multiplier being coupled to the cache memory and to said latches in a way such that said multiplier is capable of receiving the dividend, the divisor, and the fourth value in the event that the second value is determined to not be present in the cache memory.

18. A circuit for performing remainder operations, comprising:
   two data inputs, each for inputting one of a dividend and a divisor;
   a cache memory for storing and retrieving values, said cache memory being coupled to said data inputs for receiving the dividend and the divisor;
   cache memory look-up table circuitry included in the cache memory for determining whether a first value is present in the cache memory, the first value representing the value of the divisor;
   a divider for finding the remainder of the quotient of the dividend and the divisor in the event that the first value is determined to not be present in the cache memory, said divider being coupled to said data inputs for receiving the dividend and the divisor in the event that the first value is determined to not be present in the cache memory;
   look-up circuitry associated with said cache memory look-up circuitry for determining, upon a determination that the first value is present, whether a second value is present in the cache memory, the second value representing the value of the dividend;
   cache memory retrieval circuitry included in the cache memory for, upon a determination that the second value is present, reading a third value from the cache memory as a quotient of the dividend and the divisor;
   a multiplier for finding the remainder of the quotient of the dividend and the divisor using the divisor, the dividend, and the third value read from the cache memory, upon the determination that the second value is present in the cache memory, said multiplier being coupled to the cache memory in a way such that said multiplier is capable of receiving the dividend, the divisor, and the third value upon the determination that the second value is present in the cache memory;
   retrieval circuitry associated with said cache memory retrieval circuitry for, in the event that the second value is determined to not be present in the cache memory, reading a fourth value from the cache memory as a reciprocal of the divisor, the fourth value corresponding to and representing the reciprocal of the first value; and
   multiplier circuitry associated with the multiplier for finding the remainder of the quotient of the dividend and the divisor using the divisor, the dividend, and the fourth value, in the event that the second value is determined to not be present, said multiplier circuitry being coupled to said data inputs and to the cache memory in a way such that said multiplier is capable of receiving the dividend, the divisor, and the fourth value upon the determination that the second value is not present in the cache memory.

19. The method of performing remainder operations according to claim 18, wherein the divider includes circuitry for finding the remainder using Radix 4 division.

20. A circuit for performing remainder operations comprising:

two latches, each for inputting one of a first dividend and a first divisor;

a divider coupled to said latches for receiving the first divisor and for determining the reciprocal of the first divisor;

a cache memory for storing the first divisor, the reciprocal, and the first dividend, the cache memory being coupled to said latches for receiving the divisor and the dividend, the cache memory being coupled to said divider for receiving the reciprocal;

a multiplier for multiplying the reciprocal and the first dividend to find a quotient of the first dividend and the first divisor, said multiplier being coupled to said cache memory, to said latches, and to said divider and being capable of receiving the divisor and the reciprocal;

circuitry associated with the cache memory and coupled to said multiplier for storing the quotient in the cache memory;

latch circuitry associated with the two latches for inputting a second dividend and a second divisor;

cache memory look-up table circuitry included in said cache memory for determining whether the second divisor is present in the cache memory and for determining, upon a determination that the second divisor is present in the cache memory, whether the second dividend is present in the cache memory;

cache memory retrieval circuitry for, upon a determination that the second dividend is present in the cache memory, reading the quotient from the cache memory; and multiplier circuitry associated with said multiplier for finding the remainder of the quotient of the second dividend and the second divisor using the second dividend, the second divisor, and the quotient read from the cache memory, said multiplier circuitry being coupled to the cache memory in a way such that said multiplier circuitry is capable of receiving the second dividend, the second divisor, and the quotient upon the determination that the second dividend is present in the cache memory.

21. The circuit for performing remainder operations according to claim 20, further comprising divider circuitry associated with the divider for finding the remainder of the quotient of the second dividend and the second divisor using the second dividend and the second divisor, in the event that the second divisor is determined to not be present in the cache memory, said divider being coupled to said latches in a way such that said divider is capable of receiving the second dividend and the second divisor in the event that the second divisor is determined to not be present in the cache memory.

22. The circuit for performing remainder operations according to claim 21, wherein the divider circuitry includes circuitry for finding the remainder of the quotient of the second dividend and the second divisor using Radix 4 division.

23. The circuit for performing remainder operations according to claim 20, further comprising:

retrieval circuitry associated with the cache memory retrieval circuitry for, in the event that the second dividend is determined to not be present in the cache memory, reading the reciprocal from the cache memory as a reciprocal of the second divisor; and multiplier circuitry associated with the multiplier for finding the remainder of the quotient of the second dividend and the second divisor using the second dividend, the second divisor, and the reciprocal, said multiplier circuitry being coupled to said data inputs and to the cache memory in a way such that said multiplier is capable of receiving the second dividend, the second divisor, and the reciprocal upon the determination that the second dividend is not present in the cache memory.

24. A circuit for performing division operations, comprising:

a first latch for inputting a first divisor;

a second latch for inputting a first dividend;

a divider coupled to the first latch for receiving the first divisor and for determining a reciprocal of the first divisor;

a cache memory for storing the first divisor and the reciprocal of the first divisor, the cache memory being coupled to the first latch to allow the cache memory to receive the first divisor, the cache memory being coupled to the divider to allow the cache memory to receive the reciprocal of the first divisor;

a multiplier for producing the quotient of the first dividend and the first divisor, the multiplier being coupled to the cache memory to allow the multiplier to receive the reciprocal of the first divisor, the multiplier being coupled to the second latch for receiving the first dividend, the multiplier determining the quotient of the first dividend and the first divisor by multiplying the reciprocal of the first divisor and the first dividend;

latch circuitry associated with the first latch for inputting a second divisor;

latch circuitry associated with the second latch for inputting a second dividend;

circuitry associated with the cache memory coupled to the first latch to allow the cache memory to receive the second divisor;

cache memory look-up circuitry for determining whether a value corresponding to the second divisor is present in the cache memory, the cache memory look-up circuitry being contained in the cache memory;

cache memory retrieval circuitry for reading as a reciprocal of the second divisor the reciprocal of the first divisor from cache memory, in the event that a value corresponding to the second divisor is determined to be present in the cache memory, the cache memory retrieval circuitry being contained in the cache memory;

divider circuitry associated with the divider coupled to the second latch for receiving the second divisor and determining a reciprocal of the second divisor, in the event that a value corresponding to the second divisor is determined to not be present in the cache memory;

circuitry associated with the cache memory coupled to the divider to allow the cache memory to receive and store the reciprocal of the second divisor, in the event that a value corresponding to the second divisor is determined to not be present in the cache memory; and multiplier circuitry associated with the multiplier for producing the quotient of the second dividend and the second divisor, said multiplier circuitry being capable of receiving the reciprocal of the second divisor, said multiplier circuitry being coupled to the second latch to receive the second dividend, said multiplier circuitry determining the quotient of the second dividend and the second divisor by multiplying the reciprocal of the second divisor and the second dividend.

25. A circuit for performing division operations in an efficient manner by storing and retrieving recently-input divisors and their reciprocals, said circuit comprising:

input circuitry for inputting a first divisor and a first dividend, and for subsequently inputting a second divisor and a second dividend;

a divider coupled to the input circuitry for receiving the first divisor determining a reciprocal of the first divisor;

a multiplier for finding the quotient of the first dividend and the first divisor by multiplying the first dividend by the reciprocal of the first divisor, said multiplier being coupled to the input circuitry for receiving the first dividend, said multiplier being coupled to the divider for receiving the reciprocal of the first divisor;

a cache memory for storing the first divisor and the reciprocal of the first divisor, said cache memory being coupled to said input circuitry for receiving the first divisor, said cache memory being coupled to said divider for receiving the reciprocal of the first divisor, said cache memory further comprising:

cache memory look-up circuitry for determining whether a value corresponding to the second divisor is contained in the cache memory, and cache memory retrieval circuitry for retrieving a value as a reciprocal of the second divisor the reciprocal from the cache memory, in the event that a value corresponding to the second divisor is determined to be present in the cache memory;

wherein said multiplier is coupled to said cache memory in a way such that said multiplier is capable of receiving the value of the reciprocal of the second divisor from the cache memory in the event that a value corresponding to the second divisor is determined to be present in the cache memory, and wherein said multiplier is capable of computing the quotient of the second dividend and the second divisor by multiplying the second dividend and the reciprocal of the second divisor.

26. The circuit for performing division operations in an efficient manner by storing and retrieving recently-input divisors and their reciprocals according to claim 25, wherein said circuit further comprises:

divider circuitry associated with said divider for determining the reciprocal of the second divisor, in the event that a value corresponding to the second divisor is determined to not be present in the cache memory;

wherein said multiplier is coupled to said divider in a way such that said multiplier is capable of receiving the value of the reciprocal of the second divisor from said divider in the event that a value corresponding to the second divisor is determined to not be present in the cache memory.

* * * * *